3,544,565
PHTHALOCYANINE AND DIOXAZINE SULPHUR DYESTUFFS AND A PROCESS FOR THEIR PREPARATION
Djavad Razavi, Paris, France, assignor to Ugine Kuhlmann, Paris, France
No Drawing. Filed Mar. 28, 1968, Ser. No. 717,414
Claims priority, application France, Mar. 31, 1967, 100,915
Int. Cl. C09b 19/00, 47/06
U.S. Cl. 260—244      4 Claims

ABSTRACT OF THE DISCLOSURE

Process for the preparation of sulphur dyestuffs which comprises treating a dyestuff containing in its molecule at least two —$SO_2X$ substituents, in which X represents a hydrogen or halogen atom, a monovalent cation or an SY group, in which Y represents a hydrogen atom or a monovalent cation with a thioamide in aqueous acid medium and at a temperature from 0° C. to 100° C. inclusive; and sulphur dyestuffs thus obtained.

---

The present invention relates to new sulphur dyestuffs and to a process for their preparation.

According to the invention a process is provided which comprises treating a dyestuff containing at least two —$SO_2X$ substituents in its molecule, in which X represents a halogen or hydrogen atom, a monovalent cation or an SY group in which Y represents a hydrogen atom or a monovalent cation with a thioamide in aqueous acid medium at a temperature from 0° C. to 100° C. inclusive, preferably from 0° to 80° C.

The invention also includes sulphur dyestuffs made by the process of the invention.

It has been suggested that sulphur dyestuffs can be obtained by reacting phthalocyanine sulphochlorides with thiourea at temperatures ranging from 110° C. to 175° C. This reaction is effected in practice in the presence of an organic solvent or an excess of thiourea acting as a solvent. Compared with this prior process, the process of the present invention has the advantage of enabling the suspension of sulphochloride is neutralised and then obtained in acid suspension to be used without isolating them.

United States patent application No. 471,725, now abandoned suggests reacting dyestuff sulphochlorides with thiourea in aqueous medium, but according to the process of this application, the excess acid present in the suspension of sulphochloride is neutralised and then the hydrochloric acid which is formed during the reaction is neutralised. Water soluble dyestuffs are obtained. In the process of the present invention, on the contrary, the process is carried out in acid medium, and moreover, the dyestuffs obtained are water insoluble and only form an aqueous solution under the action of reducing agents, especially alkali metal sulphides.

The dyestuffs containing $SO_2X$ groups which can be used in the process of the invention may belong to various classes and the phthalocyanines and oxazines may be particularly mentioned.

The introduction of sulphohalide groups into the dyestuffs may be carried out by generally known methods, such as for example sulphochlorination by chlorosulphonic acid or conversion of sulphonic groups into sulphochloride groups by the action of chlorosulphonic acid, thionyl chloride, phosphorus pentachloride, phosphorus trichloride and chlorine or analogous reagents. From dyestuffs containing sulphohalide groups there may be obtained dyestuffs, containing $SO_2H$ groups in the free state or in the form of salts, for example by the process described in copending United States patent application No. 493,247 or dyestuffs containing $SO_2SH$ groups in the free state or in the form of salts, for example by the processes described in United States patent application No. 471,725.

Examples of thioamides which may be used are thiourea or an alkyl, aryl, or aralkyl derivatives thereof, thioformamide, thioacetamide, thiobenzamide, dithiobiuret or a derivative thereof.

The dyestuffs obtained have the general properties of sulphur dyestuffs and may be applied according to all the dyeing or printing processes used for this class of dyestuffs. They are distinguished by the brilliancy of their shades and their very good fastness to light.

In the following examples, which are purely illustrative, the parts are parts by weight unless the contrary is indicated.

EXAMPLE 1

24 parts of copper phthalocyanine are added to 75 parts by volume of chlorosulphonic acid with external cooling, and the mixture is then heated up to 135° C. in a period of three quarters of an hour, maintained for 4 hours at between 135° C. and 142° C. cooled to 115° C., then 17 parts of thionyl chloride are added and the temperature is maintained at between 115° C. and 120° C. for two and a half hours.

After cooling, the reaction mixture is poured into 500 parts of ice water, 70 parts of thiourea are added, and the temperature is allowed to rise to 20° C. over a period of half an hour. This temperature is maintained for half an hour, the mixture is heated up to 80° C. in a period of one hour and maintained for an hour at this temperature. The dyestuffs is filtered off, washed with hot water and dried at 60° C. 42 parts of a green powder are obtained which dyes cellulosic fibers, from a bath or alkali metal sulphide according to the technique for sulphur dyestuffs, in a shade which is very bright and fast to light.

EXAMPLE 2

10 parts of the dioxanine dyestuff of the formula:

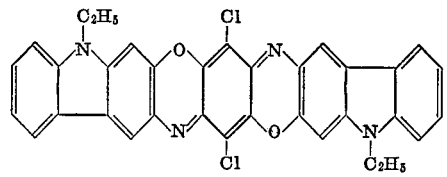

are added to 500 parts by volume of chlorosulphonic acid with external cooling, the mixture is heated up to 110° C. in a period of 1½ hours, maintained for an hour at this temperature, 6 parts by volume of thionyl chloride are added over a quarter of an hour and the mixture is maintained for a further 2½ hours at 110° C. It is left to cool, poured into 400 parts of ice water, then 40 parts of thiourea are added and the whole is heated up to 80° C. in a period of 1½ hours and maintained for an hour at this temperature. The dyestuff is filtered off, washed with hot water and dried at 60° C. 17 parts of a deep blue powder are obtained which dyes cellulosic fibres from a bath of alkali metal sulphide in a bright navy blue shade, which is fast to light and to washing.

EXAMPLE 3

40 parts of the sodium tetrasulphinate obtained from copper phthalocyanine tetrasulphochloride and sodium sulphite are dissolved in 400 parts of water, and 60 parts of thiourea and 40 parts of concentrated hydrochloric acid are added, and the mixture is heated up to 80° C. in a period of an hour and maintained at this temperature for an hour.

The dyestuff obtained is filtered off, washed with hot water and dried at 60° C. A green powder is obtained which dyes cellulosic fibres a bright green shade which is fast to light.

EXAMPLE 4

10 parts of the dioxzine dyestuff of the formula given in Example 2 are sulphochlorinated by means of 50 parts by volume of chlorosulphonic acid and 15 parts by volume of thionyl chloride. The sulphochloride obtained is washed with ice water and added to a solution of 20 parts of sodium sulphite dissolved in 300 parts of water at 0° C. The pH of the mixture is kept at about 8.5 by means of sodium bicarbonate and stirring is continued for 4 hours at 0° C., the pH being always kept at about 8.5. The temperature of the reaction mixture is allowed to rise to 20° C., it is stirred for an hour at this temperature, and the sulphinic derivative is precipitated by the addition of sodium chloride.

This derivative is dissolved in 500 parts of water. 40 parts of thiourea and 40 parts of concentrated hydrochloric acid are added, and the mixture is heated up to 80° C. in a period of half an hour and maintained an hour at this temperature. The dyestuff is filtered off, washed with hot water and dried at 60° C. A deep blue powder is obtained which dyes cellulosic fibres from a bath of alkali metal sulphide a navy blue shade which is fast to light.

EXAMPLE 5

24 parts of copper phthalocyanine are added to 75 parts by volume of chlorosulphonic acid with external cooling, the mixture is heated to 135–142° C. in the course of three-quarters of an hour, maintained for 4½ hours at this temperature cooled to 115–120° C., 20 parts by volume of thionyl chloride are added in the course of 20 minutes, and the reaction mixture is maintained at a temperature of 115–120° C. for 2 hours. After cooling, the solution of the dyestuff is poured on ice, the sulphochloride is filtered off and the filter cake is washed with ice water. It is then suspended in 500 parts of ice water. 50 parts of crystalline sodium sulphide and 15 parts of anhydrous sodium carbonate are added, and the mixture is stirred for about an hour at 0° C. and acidified with 25 parts of concentrated hydrochloric acid. 50 parts of thiourea are added, the mixture is heated up to 80–82° C.

in the course of three hours and maintained for 1½ hours at this temperature. The dyestuff obtained is filtered off, washed with hot water and dried at 60° C. 44 parts of a green powder are obtained which dyes cellulosic fibres from a bath of alkali metal sulphide a very bright green shade which is fast to light and to washing.

What is claimed is:
1. A process for the preparation of sulphur dyestuffs which comprises treating
   (a) a dyestuff selected from the group consisting of copper phthalocyanine and dioxazine, said dyestuff containing in its molecule at least two —$SO_2X$ substituents in which X represents a member selected from the group consisting of hydrogen, chlorine, and SY group wherein Y represents hydrogen, and
   (b) a member selected from the group consisting of thiourea, thioformamide, thioacetamide, thiobenzamide and dithiobiuret, in an aqueous acid medium and at a temperature of from 0–100° C.

2. A process for the preparation of sulphur dyestuffs which comprises treating
   (a) a dyestuff selected from the group consisting of copper phthalocyanine and dioxazine, said dyestuff containing in its molecule at least two —$SO_2X$ substituents in which X represents a member selected from the the group consisting of hydrogen, chlorine, sodium, and an SY group wherein Y represents hydrogen or sodium, with
   (b) a member selected from the group consisting of thiourea, thioformamide, thioacetamide, thiobenzamide and dithiobiuret,
in an aqueous acid medium and at a temperature of from 0–100° C.

3. Process according to claim 2 wherein the treatment is offered at a temperature from 0° C. to 80° C. inclusive.

4. Sulphur dyestuffs obtained according to the process claimed in claim 2.

References Cited

Labs: "Chemistry of Synthetic Dyes and Pigments" (1955) p. 622.

CHARLES B. PARKER, Primary Examiner

D. R. PHILLIPS, Assistant Examiner

U.S. Cl. X.R.

8—37; 260—314.5